July 22, 1930. F. H. BENGE 1,771,370
MECHANICAL ELEMENT
Filed April 13, 1926

Inventor:—
Frank H. Benge.
by his Attorneys,
Howson & Howson

Patented July 22, 1930

1,771,370

UNITED STATES PATENT OFFICE

FRANK H. BENGE, OF BRIDGEPORT, PENNSYLVANIA, ASSIGNOR, BY MESNE ASSIGNMENTS, TO CONTINENTAL DIAMOND FIBRE COMPANY, OF NEWARK, DELAWARE, A CORPORATION OF DELAWARE

MECHANICAL ELEMENT

Application filed April 13, 1926. Serial No. 101,740.

This invention relates to that type of gear or similar mechanical element which comprises a metal center and a non-metallic peripheral portion consisting of vulcanized fibre, fibre impregnated with an artificial gum, such as bakelite, rubber, molded bakelite, or other non-metallic substances having desired physical characteristics or sound-deadening properties.

The principal object of this invention is to provide a gear of this type that combines with the necessary rigidity an exceptional flexibility.

Another object of the invention is to provide a mechanical element of this type in which the degree of flexibility may be varied without departing from the principle upon which the element is constructed.

A further object of the invention is to provide novel and improved means for uniting the metallic center portion of the element with the non-metallic peripheral part.

A still further object of the invention is to provide a mechanical element of this type which lends itself readily to the replacement of the non-metallic peripheral part as the latter becomes excessively worn.

The invention further resides in a certain desirable non-integral formation of the central portion involving the use of a hub part separate from the part intermediate the hub and the non-metallic peripheral part.

The invention also contemplates the provision of a mechanical element or gear of extreme lightness and of great strength.

Figure 1:
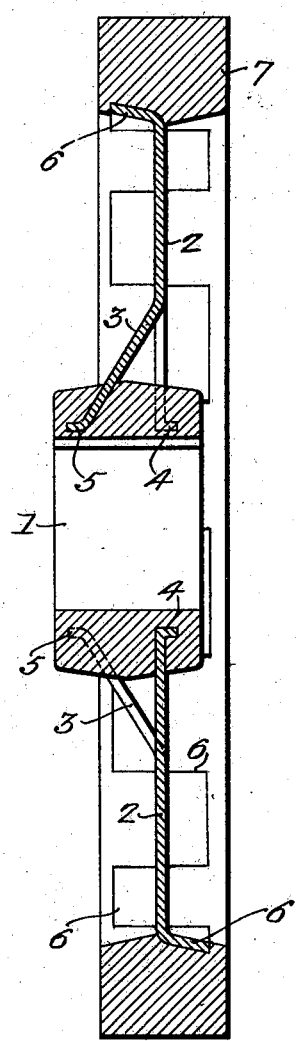
Figure 2:
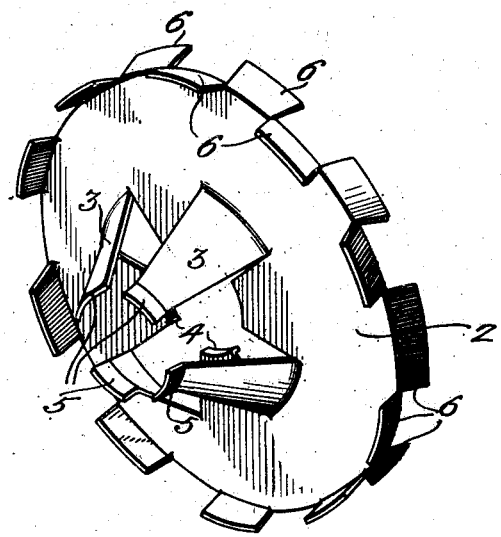

In the attached drawings:

Figure 1 is a transverse vertical section through a gear blank or roll made in accordance with my invention, and Fig. 2 is a view in perspective of the pressed steel element forming a part of the metallic center.

Referring to the drawings, the element comprises in a preferred form a hub element 1 of a suitable moldable or cast material, and preferably of cast metal. Embedded in the hub 1 are the inner peripheral parts of an annular pressed steel or similar web 2 formed as shown in Fig. 2. This element 2, which is adapted to be struck up from an annular disk of sheet metal, preferably sheet steel, comprises at its inner periphery a plurality of struck-out tongues 3 which project from the plane of the body of the disk and are inclined thereto so that when the inner periphery is embedded in the hub portion 1 as previously described, these elements 3 function as struts bracing and strengthening the disk against transverse pressures or thrusts, as will be readily understood by reference to the drawings.

In order to more firmly unite the hub and web, the inner edges of the embedded parts are flanged transversely, as indicated at 4 and 5. The outer periphery of the annular disk 2 also comprises a plurality of transversely extending tongues 6 which are formed in the present instance by radially slitting the disk inwardly from the periphery to the desired depth of the tongues, and thereafter bending down the tongues so that they project transversely from the plane of the disk. In the present form, the tongues alternate from one side to the other and preferably incline slightly upwardly towards their outer edges from the true perpendicular with the plane of the disk.

The non-metallic peripheral part 7 of this mechanical element is mounted outwardly of the tongues 6 and preferably with the said tongues partially or completely embedded therein so that this annular peripheral portion 7 is firmly bound to the metal center. The part 7 may be applied to the metal center in many different ways, and where practical, such as in the case of bakelite, rubber and other moldable materials, these parts may be molded directly on the peripheral portion of the metal center 2.

By employing the pressed metal web portion 2, which as previously stated is preferably pressed steel, I obtain with sufficient rigidity a considerable flexibility which is capable of withstanding great shock, such for example as may result from the end thrust of helical gear teeth. Furthermore, the flexibility of the element may be regulated for particular conditions by making the tongues 3 more or less long, it being apparent that the greater length of these struts 3, the less will be the flexibility in the element.

A material advantage is also obtained in the use of the transversely projecting tongues 6 which when embedded in the non-metallic peripheral portion 7 afford a very desirable driving connection between the peripheral part 7 and the metallic center portion of the gear. At the same time, this construction provides for removal of the non-metallic portion 7, when this becomes unduly worn, and its replacement with a new element.

A further advantage is obtained in the use of the cast metal or other hub member 1. This provides a wide choice in materials to suit the various conditions, such for example where the element is to be used as an idler gear or the like running loose on a dead shaft, and I may employ cast iron or bronze for this hub portion whereas steel, aluminum or cast iron may be used for hubs which are to be keyed to operating shafts. The gear has also a very substantial advantage in the fact that it may be made extremely light without sacrificing strength, which feature is a particularly desirable one in machines in which the gears must not interfere with fly wheel action.

There may be considerable modification in the form and details of the device without departing from the essential features of the invention.

I claim:

1. A mechanical element comprising a hub, a sheet metal disk embedded in said hub and comprising integral inclined strut portions also embedded in the hub, and a separate peripheral part secured to said web.

2. As a new article of manufacture, a pressed metal disk having integral transversely inclined tongues at its inner periphery and at its outer periphery a plurality of tongues transversely projecting from opposite sides of the element.

FRANK H. BENGE.